United States Patent [19]

Stankiewicz

[11] Patent Number: 6,103,149
[45] Date of Patent: *Aug. 15, 2000

[54] METHOD FOR PRODUCING CONTROLLED ASPECT RATIO RETICULATED CARBON FOAM AND THE RESULTANT FOAM

[75] Inventor: Edwin P. Stankiewicz, Valley Village, Calif.

[73] Assignee: Ultramet, Pacoima, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/678,990

[22] Filed: Jul. 12, 1996

[51] Int. Cl.$^7$ .................................................... C08G 18/00
[52] U.S. Cl. ...................... 264/29.1; 264/29.6; 264/29.7; 264/80; 423/445 R
[58] Field of Search ....................... 423/445 R; 264/29.1, 264/29.6, 29.7, 80

[56] References Cited

U.S. PATENT DOCUMENTS

| | | | |
|---|---|---|---|
| 3,927,186 | 12/1975 | Vinton et al. | 423/445 |
| 4,022,875 | 5/1977 | Vinton et al. | 264/29.6 |
| 4,067,956 | 1/1978 | Franklin et al. | 423/445 |

OTHER PUBLICATIONS

Klempner & Frisch; Polymeric Foams; 1991 pp. 30, 31 and 67.

*Primary Examiner*—Rachel Gorr
*Attorney, Agent, or Firm*—Bruce A. Jagger

[57] ABSTRACT

A method of manufacturing and the resultant reticulated open cell carbon foam with a controlled aspect ratio between 0.6 to 1.2 throughout the body of the foam billet by controlling the exothermic reaction of the resin system below the decomposition temperature of the foam.

9 Claims, 6 Drawing Sheets

METHOD FOR PRODUCING CONTROLLED ASPECT RATIO RETICULATED CARBON FOAM AND THE RESULTANT FOAM

BACKGROUND

Open cell vitreous carbon foam, also called reticulated vitreous carbon foam, is a vitreous carbon structure of three dimensional interconnected polyhedron cells. Vitreous carbon is a glassy carbon as opposed to a graphitic carbon. A cell is typically comprised of 12 to 14 connected struts or ligaments which form a three dimensional polyhedron. An open cell is a cell where no film or solid is connected between the ligaments so that there is free communication in to and out of a cell, and in a group of adjoining cells all cells are interconnected and form a three dimensional interconnected structure. An open cell foam has a structure which typically consists of three dimensional interconnected polyhedron cells with 12 to 14 ligaments composing each cell, and each cell having a spheroidal shape.

The degree to which the cell shape approaches a perfectly spherical shape is measured by the aspect ratio. The aspect ratio is a dimensionless number, defined for the purpose of this patent application, as the diameter of the cell in the vertical direction divided by the diameter of the cell in the horizontal direction. A perfectly spherical cell would has an aspect ratio of 1.

The shape of the cell and hence the aspect ratio of the cell can effect the performance of the bulk vitreous carbon foam which is comprised of these cells. The strength of the bulk vitreous carbon and the resistance to flow of fluids through the bulk vitreous carbon are some of the physical properties of the bulk carbon foam affected by the aspect ratio.

Since the physical properties of carbon foam are affected by the aspect ratio, an aspect ratio of 1 would be required for a completely isotropic foam. Users of carbon foam often desire isotropic behavior from the foam and therefore desire a foam with an aspect ratio as close to 1 as possible, and find an aspect ratio between 0.6 to 1.2 acceptable for these purposes.

Vitreous carbon foam is often coated with other materials via a chemical vapor deposition process. If the underlying vitreous carbon foam has a vast majority of cells with aspect ratios greatly different than 1 the resultant coated foam will have cells with aspect ratios greatly different than 1 and the resultant coated foam may have anisotropic properties. Chemical vapor deposition is used to coat carbon foams with ceramics such as SiC or BN and metals such as W or Ta. One application of Ta coat carbon foam is in vivo exoskeleton bone implants and tissue reception as shown by Kaplan U.S. Pat. No. 5,282,861. In this particular application it has been found necessary to produce carbon foam billets at least 6" thick and as much as 8" thick where the cells of the carbon foam have an aspect ratio between 0.6 to 1.2. Therefore there is a demonstrated commercial need for vitreous carbon foam of thickness greater than 6" having cells with aspect ratios between 0.6 to 1.2.

PRIOR ART

Reticulated vitreous carbon open cell foam has been manufactured by first impregnating polyurethane open cell foam with carbonaceous thermal setting resins. The resin impregnating foam is then rapidly heated to some arbitrary curing temperature such as 100° C.–200° C. to thermal set the resin. The thermal set impregnated foam is then heated to a suitable pyrolysis temperature, on the order of 800° C.–2000° C., in order to convert the carbonaceous resin in to vitreous carbon. Vinton et al, U.S. Pat. No. 4,022,875, discloses a method which endeavors to faithfully reproduce the cell geometry of the polyurethane foam precursor in the resultant vitreous carbon foam. This prior art method rapidly heats the resin impregnated foam to a curing temperature necessary to thermal set the resin. This prior art method makes no attempt to control the shape of the carbon foam cell but targets faithful polyurethane foam geometry reproduction. Franklin U.S. Pat. No. 4,067,956 describes a method of producing an anisotropic vitreous carbon open cell foam which is compressed a minimum of 50% in only one direction. This patent physically compresses the foam a minimum of 50% in one direction during processing or uses a minimum of 50% compressed polyurethane foam precursor. The reason a minimum of 50% compression is required is that in the prior art methods a substantially uniform modification of the aspect ratio throughout the majority of the volume of the bulk foam could not be achieved unless a minimum of 50% compression or an aspect ratio of 0.5 or less was achieved.

Neither of aforementioned prior art patents discusses the temperature at which the carbonaceous resin undergoes an exothermic reaction and begins to crosslink and thermal set. Nor does this prior art discuss, control or employ this exotherm to specifically control or modify the cell shape within the resultant vitreous carbon foam. In the prior art attempts to faithfully reproduce the geometry of the polyurethane open cell foam precursor, this precursor typically has an aspect ratio of 1.4. In other prior art, the foam is physically compressed by at least 50% in one direction, resulting in an aspect ratio less then or equal to 0.5.

SUMMARY OF INVENTION

It is the object of the present invention to control the aspect ratio of the cells within the vitreous carbon foam to between 0.6 and 1.2. In the method of the present invention a polyurethane open cell foam is first impregnated with a carbonaceous resin. The open cell polyurethane foam typically has a aspect ratio of 1.3 to 1.4. This aspect ratio is not faithfully reproduced but modified during the process of the present invention to reach the desired aspect ratio of 0.6 to 1.2. The resin is comprised of a carbonaceous liquid such as furfuryl alcohol, furan or phenolic compounds, and an activating catalyst such as methyl para-toluene sulfonate, para-toluene sulfonic acid, citric acid and oxalic acid. A preferred resin for the present invention is furfuryl alcohol carbonaceous liquid and methyl para-toluene sulfonate catalyst.

The above described resin system must thermal set in an exothermic reaction which takes place below the decomposition temperature of the polyurethane foam. In the present invention exotherm temperatures of the polyurethane foam impregnated with the carbonaceous resin system are measured and a curing curve specific to each polyurethane foam impregnated with carbonaceous resin system is devised. The curing is performed in an inert atmosphere such as nitrogen or argon, or in a non-oxidizing atmosphere such as hydrogen, or in a vacuum. After curing, the piece is carbonized to vitreous carbon in an atmosphere, as described for curing, at a suitable temperature between 900° C. to 3000° C. The curing and carbonization can be performed in the same process sequence.

The curing curve will be at a heat up rate which will control the amount of exothermic heat released into the work piece at any given time and the curing curve will have specific holding temperatures at or before the exotherm temperature or temperatures in order to control the amount of heat released into a given work piece. The exotherm heat release holding temperatures are typically between 50° C. to 120° C. Uncontrolled exotherms can cause a melt down of an impregnated foam or cells with undesirable aspect ratios. Insufficient exotherms or endothermic reactions would not allow the polyurethane precursor cell to be modified. The curing curve heat up rate may be controlled to 150° C. to 200° C. in order to fully crosslink the thermal setting resin.

The shape of the cells in the foam is modified because the heat from the exothermic reaction softens the ligaments which comprise the foam cells and the weight of the impregnated foam compresses the cell from the polyurethane precursor aspect ratio of 1.3 to 1.4 to the desired aspect ratio of 0.6 to 1.2. The modified shape is permanently set when the resin system fully crosslinks or thermal sets. When the resin system cross links it stiffens the cell ligaments. If the resin crosslinks too quickly the polyurethane cell can not be modified sufficiently or uniformly through the body of the work piece. In some cases a weight will be placed on top of the foam to facilitate cell modification. The weight will not compress the impregnated foam by more than 20% of its thickness.

A clearer understanding of the invention will be had by reference to the following description, drawings and examples.

DETAILED DESCRIPTION OF THE INVENTION

Figure 1:
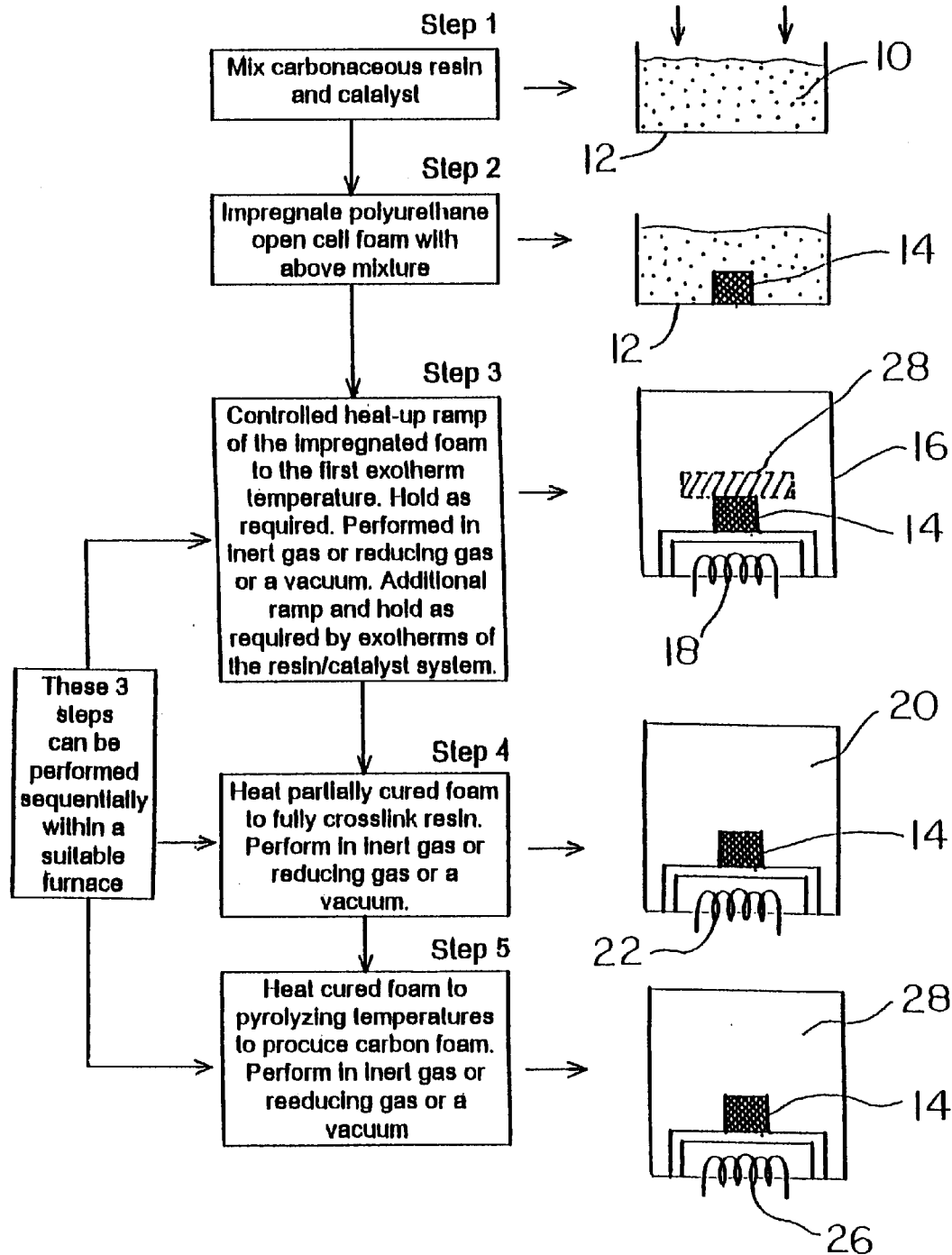
FIG. 1 illustrates, in general, the steps and generalized apparatus for performing the method of the present invention and which method may be used for any of the following examples.
Figure 2:
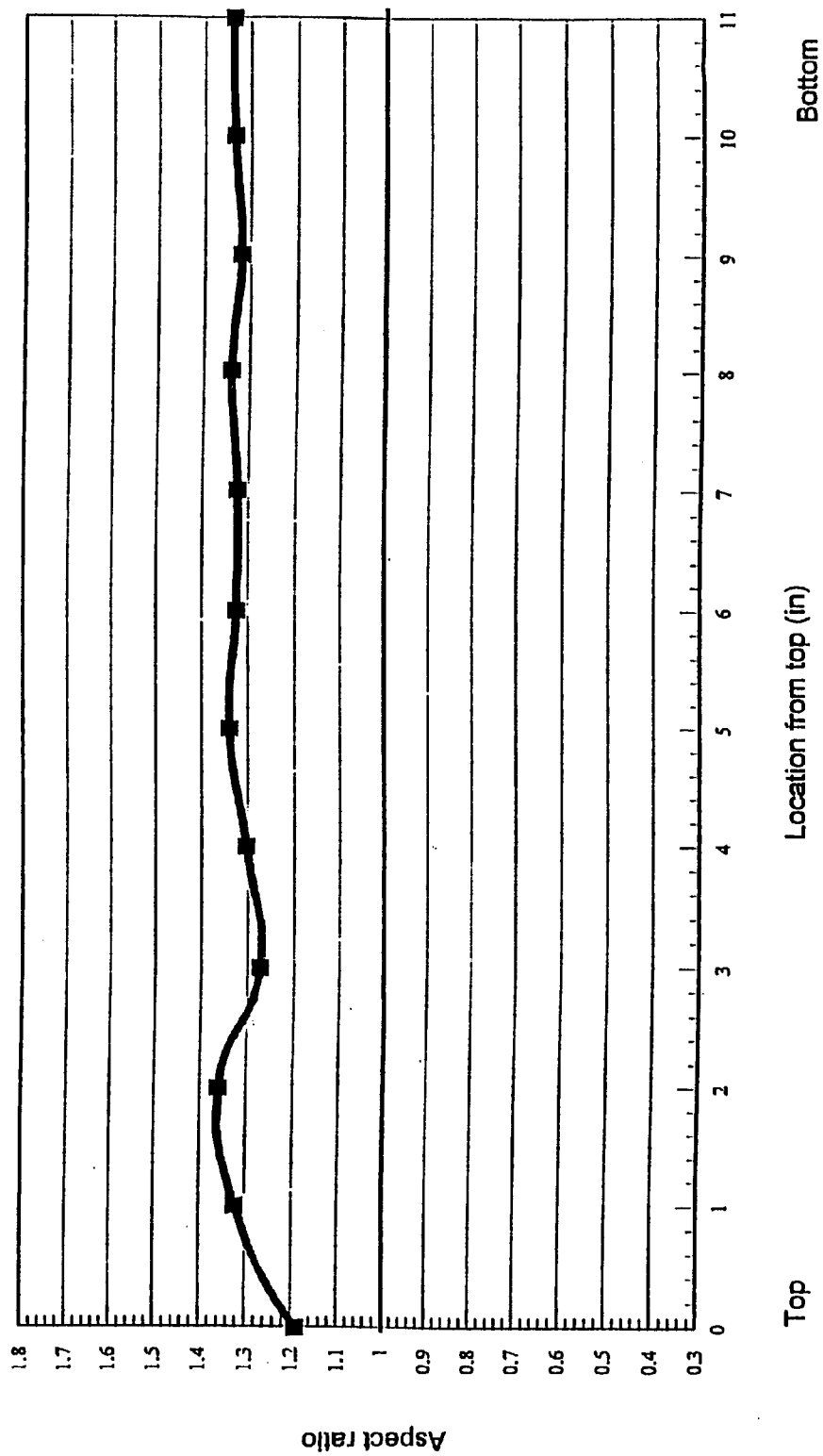
FIG. 2 is a graph illustrating the aspect ratio for one prior art foam material.

The present invention will be described in detail with reference to three specific examples, all of which can be performed using the steps of the general method of FIG. 1. Each example will have both specific times, temperatures, weights, etc. plus ranges for these times, temperatures, weights, etc. in order to practice the present invention.

EXAMPLE 1

A carbonaceous resin 10 was mixed in Step 1 in a vessel 12 using furfuryl alcohol containing 1 part per hundred methyl para-toluene sulfonate (range 0.4% to 0.4% to 8% by weight methyl para-toluene sulfonate). A piece of polyurethane foam with cells having a diameter on the order of 0.023" with aspect ratios of 1.3 to 1.4 was impregnated in step 2 with the carbonaceous resin. Excess resin was removed from the impregnated foam work piece by pressing the piece on to a perforated wooden board. The infusion of the catalyzed furfuryl resin caused the polyurethane foam to swell.

The wet, uncured piece was then placed in a retort 16. In Step 3 the retort was filled with nitrogen and was heated with heater 18 at 0.16 degrees C. per minute (range 0.05° C./min–0.7° C./min) until it reaches the exothermic heat release temperature of 70° C. (range 50° C.–90° C.). The piece was held at 70° C. for 3 hrs (range 1 to 15 hrs.) to allow the cell aspect ratio modification to take place. The piece was then heated at 0.09 degrees C. per minute (range 0.03° C. min.–0.13° C./min) until 170° C. (range 150° C.–190° C.). This second controlled ramp was necessary to allow for the complete thermal setting of the carbonaceous resin while allowing the exothermic heat of the thermal setting to dissipate without effecting the cell shape of the work piece. The furnace was allowed to cool to room temperature and the piece was removed.

In Step 4 the piece was then relocated to a high temperature furnace 20 and heated with heater 22 to 600° C. (range 400°–800° C.) over a period of 30.3 hours (range 3–60 hrs.). The furnace was allowed to cool to room temperature and the piece was removed. In Step 5 the piece was then relocated in to a high temperature retort furnace 24 and fired with heater 26 from room temperature to 1100° C. (range 900° C.–2200° C.) over a period of 7 hours (range 5–56 hrs.) in order to carbonize the resin to a vitreous carbon. The furnace was allowed to cool and the product was removed. If desired, Steps 3, 4 and 5 may be performed sequentially within the same suitable furnace.

Figure 3:
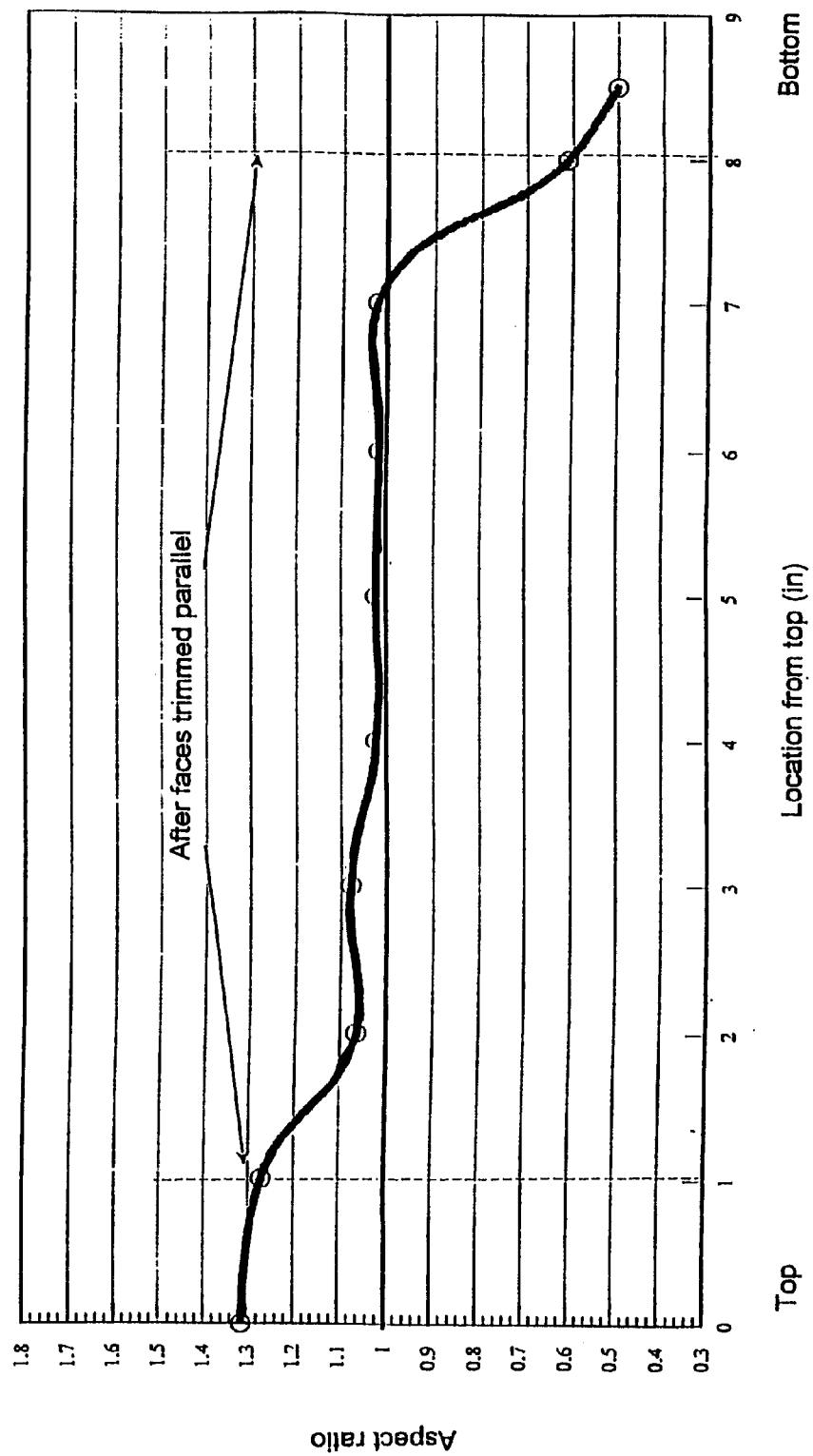
FIG. 3 is a graph illustrating the aspect ratio for Example 1 of the present invention.
Figure 6:
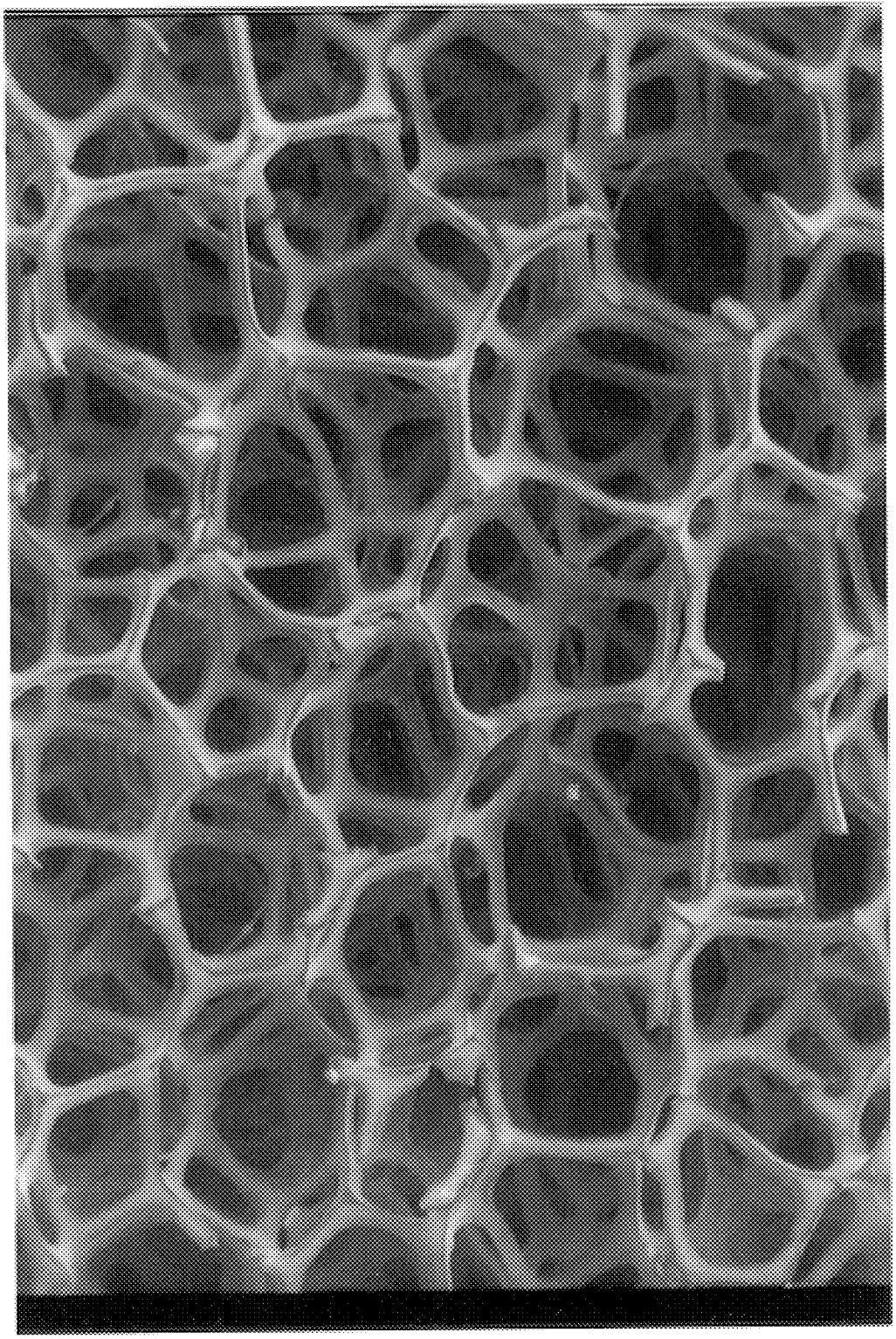
FIG. 6 illustrates an example of the resultant foam material produced by the method of the present invention.

The resultant product of Example 1 was an open cell vitreous carbon piece with the vast majority of cells having an aspect ratio between 0.6 and 1.2 as shown in FIG. 3. The visual appearance of this product would be as shown in FIG. 6.

The following two examples:

EXAMPLE 2

A carbonaceous resin was mixed in Step 1 using furfuryl alcohol containing 2 part per hundred methyl paratoluene sulfonate. A piece of polyurethane foam with cells having a diameter on the order of 0.023" with aspect ratios of 1.3 to 1.4 was impregnated in Step 2 with the carbonaceous resin. Excess resin was removed from the impregnated foam work piece by pressing the piece on to a perforated wooden board. The infusion of the catalyzed furfuryl resin caused the polyurethane foam to swell.

The wet, uncured piece was then placed in a retort. In Step 3 retort was filled with nitrogen and was heated at 0.13 degrees C. per minute until it reach the exothermic heat release temperature of 60° C. The piece was held at 60° C. for 3 hrs to allow the cell aspect ratio modification to take place. The piece was then heated at 0.1 degrees C. per minute until 170° C. This second controlled ramp was necessary to allow for the complete thermal setting of the carbonaceous resin while allowing the exothermic heat of the thermal setting to dissipate without effecting the cell shape of the work piece.

The furnace was allowed to cool to room temperature and the piece was removed. Step 4 was skipped for this Example 2. In Step 5 the piece was then relocated in to a high temperature retort furnace and fired from room temperature to 1100° C. over a period of 36.5 hours in order to carbonize the resin to a vitreous carbon. The furnace was allowed to cool and the product was removed. If desired, steps 3 and 5 may be performed sequentially within the same suitable furnace.

Figure 4:
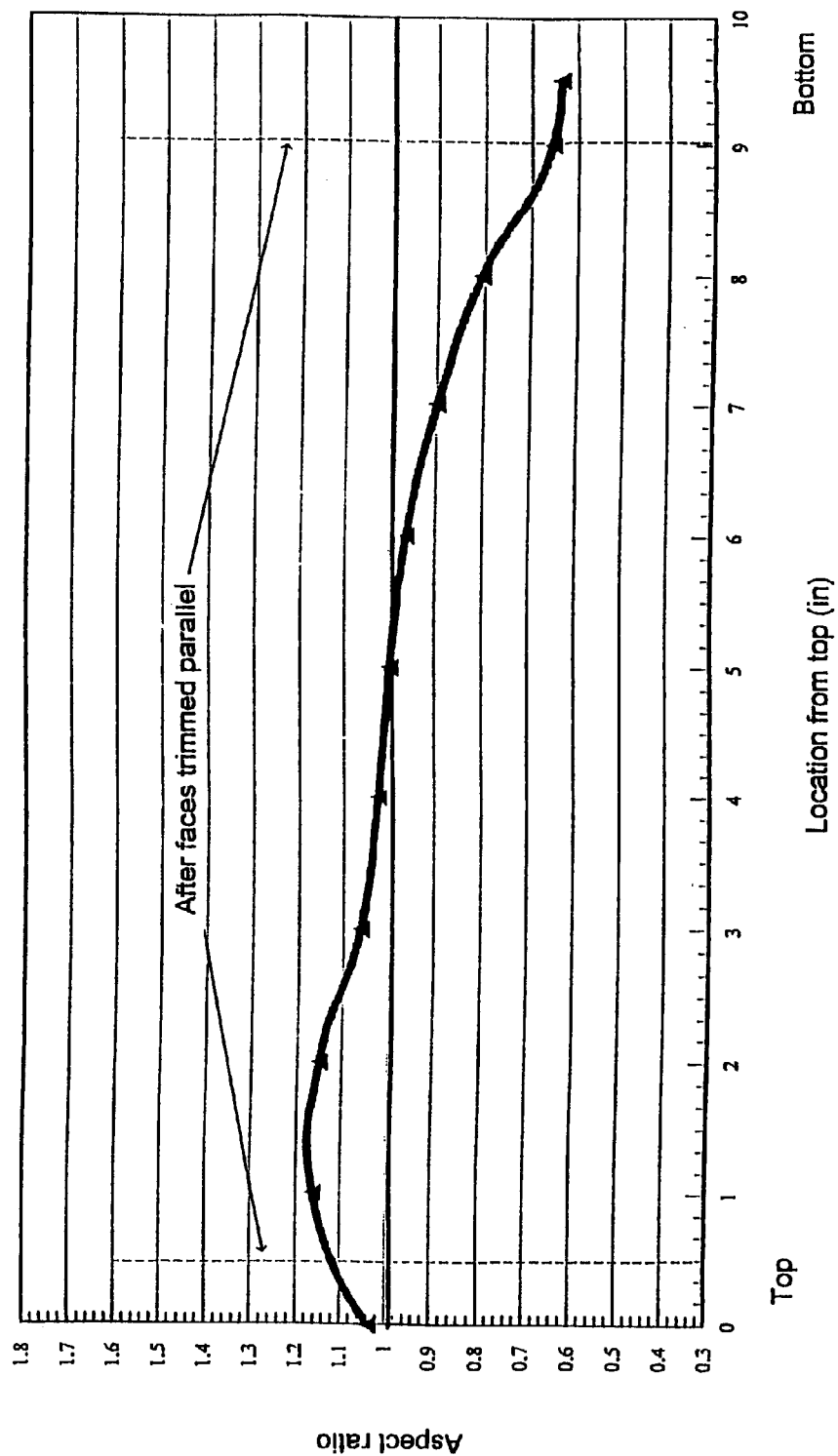
FIG. 4 is a graph illustrating the aspect ratio for Example 2 of the present invention.

The resultant product of Example 2 was an open cell vitreous carbon piece with vast majority of cells having an aspect ratio between 0.6 and 1.2 as shown in FIG. 4. The visual appearance of the product would be as shown in FIG. 6.

EXAMPLE 3

A carbonaceous resin was mixed in Step 1 using furfuryl alcohol containing 1 part per hundred methyl paratoluene sulfonate. A piece of polyurethane foam with cells having a diameter on the order of 0.023" with aspect ratios of 1.3 to 1.4 was impregnated in Step 2 with the carbonaceous resin. Excess resin was removed from the impregnated foam work piece by pressing the piece on to a perforated wooden board. The infusion of the catalyzed furfuryl resin caused the polyurethane foam to swell.

The wet, uncured piece was then placed in a retort. An uniform mass 28 (shown in Step 3 of FIG. 1) such as a solid or perforated carbon plate was placed on top of the wet, uncured piece. The carbon plate was supported by the wet, uncured piece and compressed the piece 1% in the thickness direction. In step 3 the retort was filled with nitrogen and was heated at 0.18 degrees C. per minute until it reach the exothermic heat release temperature of 70° C. The piece was held at 70° C. for 3 hrs to allow the cell aspect ratio modification to take place. The piece was then heated at 0.09 degrees C. per minute until 170° C. This second controlled ramp was necessary to allow for the complete thermal setting of the carbonaceous resin while allowing the exothermic heat of the thermal setting to dissipate without effecting the cell shape of the work piece. The furnace was allowed to cool to room temperature and the piece was removed. Step 4 was skipped for this Examples. In step 5 the piece was then relocated in to a high temperature retort furnace and fired from room temperature to 1100° C. over a period of 36.5 hours in order to carbonize the resin to a vitreous carbon. The furnace was allowed to cool and the product was removed.

Figure 5:
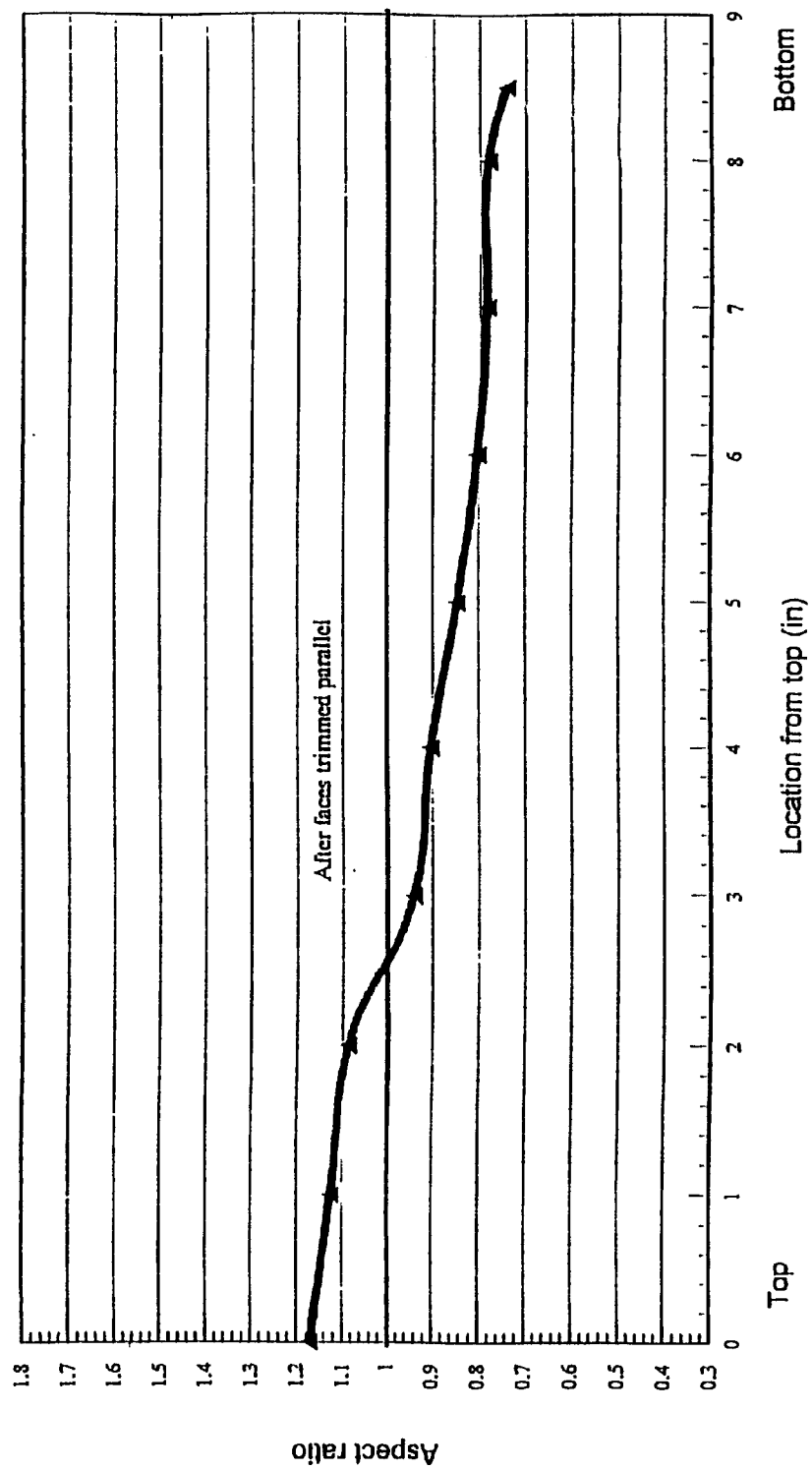
FIG. 5 is a graph illustrating the aspect ratio for Example 3 of the present invention.

The resultant of Example 3 product was an open cell vitreous carbon piece with the vast majority of cells having an aspect ratio between 0.8 and 1.2 as shown in FIG. 5. The visual appearance of the product would be as shown in FIG. 6.

As these three examples show, the polyurethane foam precursor cell shape can be modified and controlled by controlled heat up rates and exotherm heat release temperature holds. The heat up rate and hold temperature(s) depend on the carbonaceous liquid, the catalyst employed, the amount of catalyst used, and the amount of cell modification desired. On commercial size pieces, all surfaces of the pyrolyzed product exhibit some distortion due to the pyrolysis process. After the pyrolysis process the distortion zones are trimmed away to yield a product with smooth faces. The bottom 5% to 10% of the smooth product may be modified below an aspect ratio of 0.6 and the top 5% to 10% of the product may not be modified to an aspect ratio of 1.2 or less. However this area of the product is generally trimmed away to yield a more aesthetically pleasing product as shown in FIG. 6.

Although the invention has been described with references to a particular embodiment, it is to be appreciated that various adaptations and modifications may be made and the invention is only to be limited by the appended claims.

I claim:

1. A method for producing reticulated carbon foam with a controlled aspect ratio between 0.6 to 1.2 including the following steps, providing an open cell polyurethane foam, providing a catalytically curable carbonaceous thermal setting resin, impregnating the foam with the resin, curing the impregnated foam under a controlled curing cycle in an inert or reducing atmosphere or a vacuum, wherein the controlled curing cycle includes a specific exotherm plateau temperature where the curing cycle is substantially isothermally maintained for sufficient time to allow the first exothermic reaction of the thermal setting resin to release heat sufficient to soften the polyurethane foam ligaments, and allow the resultant softened polyurethane foam ligaments to assume the required shape under the weight of at least said impregnated foam to produce the desired aspect ratio and to begin crosslinking, and wherein the resulting shaped, partially crosslinked, impregnated foam continues on the controlled curing cycle along a controlled heat-up ramp, while substantially maintaining said required shape until the resin is at least substantially crosslinked, and pyrolyzing the resulting crosslinked foam in an inert or reducing atmosphere or vacuum until the crosslinked resin is transformed into vitreous carbon foam with cells having the shape and aspect ratio between 0.6 to 1.2 created during the specific exotherm plateau provided during the controlled curing cycle.

2. The method of claim 1 wherein the controlled curing cycle includes at least an additional exotherm heat release plateau holding temperature to allow for substantially complete thermal setting of the resin.

3. The method of claim 1 wherein a uniformly distributed mass is provided and including the step of placing the mass on top of and supported by the impregnated foam before the controlled curing, to compress the impregnated foam between 0% to 20%.

4. A method for producing reticulated carbon foam with a controlled aspect ratio between 0.6 to 1.2 including the following steps, providing an open cell polyurethane foam, providing a furfuryl alcohol with said furfuryl alcohol containing an effective amount of an activating catalyst to form a resin, impregnating the foam with the resin, curing the impregnated foam under a controlled curing cycle in an inert or reducing atmosphere or a vacuum wherein the controlled curing cycle includes heating at a rate between 0.05° C./min to 0.7° C./min to an exotherm plateau temperature between 50° C. to 90° C. wherein the curing cycle is substantially isothermally maintained for 1 to 15 hours to allow the first exothermic reaction of the thermal setting resin to release heat sufficient to soften the polyurethane foam ligaments and allow said foam ligaments to assume the required shape to produce the desired aspect ratio and to begin crosslinking, and wherein the resulting partially crosslinked impregnated foam continues on the controlled curing cycle along a controlled heat-up ramp, at a rate of between 0.03° C./min to 0.13° C./min to a temperature between 150° C. to 190° C. while substantially maintaining said required shape, until the resin is at least substantially fully crosslinked, pyrolyzing the resulting crosslinked foam to a temperature between 900° C. to 1400° C. in an inert or reducing atmosphere or a vacuum until the crosslinked resin is transformed into vitreous carbon foam with cells having the shape and aspect ratio between 0.6 to 1.2 created during the exothermic plateau provided during the controlled curing cycle.

5. The method of claim 4 wherein after the foam is heated to the exotherm plateau temperatures the foam is heated to a temperature between 400° to 800° C. for a period between 3 to 60 hours before the foam is pyrolyzed.

6. The method of claim 4 wherein said activating catalyst comprises from about 0.4% to 8% by weight methyl para-toluene sulfonate.

7. A reticulated carbon foam body, including an open cell structure formed of three dimensional interconnected open polyhedron shaped cells comprising vitreous carbon, said reticulated carbon foam body having a thickness of at least about 6 inches in the as made vertical direction, the majority of said open polyhedron shaped cells in said reticulated carbon foam body having a generally spheroidal shape and being defined by interconnected ligaments, said ligaments being substantially free of interconnecting solid walls, whereby there is free communication into and out of said open polyhedron shaped cells, said open polyhedron shaped cells having an aspect ratio defined as the diameter of the cell in the as made vertical direction divided by the diameter of the cell in the as made horizontal direction, and the majority of said open polyhedron shaped cells throughout the thickness of said reticulated carbon foam body having an aspect ratio between 0.8 and 1.2.

8. The reticulated carbon foam body of claim 7 wherein substantially all of said open polyhedron shaped cells in said reticulated carbon foam body are substantially isotropic in configuration.

9. The method of claim 1 including providing an open cell polyurethane foam having a thickness of at least 6 inches.

* * * * *